3,740,309
PROCESS FOR TREATING AMMONIA-BASE WASTE SULFITE LIQUOR
Toivo Lahtvee, 7 Gatesview Ave., Scarborough, Ontario, Canada; Bal Krishan Sethi, 253 Wellesley St. E., Toronto, Ontario, Canada; and William Hubbard Stark, The Edgecliff, Apt. 1705, 2200 Victory Parkway, Cincinnati, Ohio 45206
No Drawing. Filed Sept. 22, 1971, Ser. No. 182,831
Int. Cl. D21c 11/02
U.S. Cl. 162—36                    14 Claims

ABSTRACT OF THE DISCLOSURE

The amount of calcium contained in ammonia-base waste sulfite liquor is reduced by precipitating the calcium as calcium sulfite and separating the precipitate from the remaining waste sulfite liquor solution. The precipitation is caused by dissolving in the waste sulfite liquor (1) additional calcium, (2) magnesium, and (3) a source of sulfite ions. By "additional" calcium is meant amounts greater than that contained in the ammonia-base waste sulfite liquor obtained from the pulping process.

---

This invention relates to a process for treating ammonia-base waste sulfite liquor. More particularly, the present invention relates to a process for precipitating calcium from ammonia-base waste sulfite liquor as calcium sulfite. This process includes the steps of adding liquor, namely (a) adding magnesium ions to the waste sulfite liquor so as to obtain a waste sulfite liquor solution containing above about 9,000 p.p.m. of ammonia-magnesium cations dissolved therein prior to the completion of precipitation of the calcium sulphite; (b) adding additional calcium ions to the waste sulfite liquor prior to the completion of precipitation of the calcium sulfite; and (c) adding a source of sulfite ions such as sulfur dioxide to the waste sulfite liquor in at least an amount sufficient to cause the calcium therein to precipitate as calcium sulfite.

BACKGROUND OF THE INVENTION

Sulfite pulping processes are a group of commonly used processes for obtaining pulp from wood or other cellulosic materials. In the sulfite processes, the cellulosic materials are normally treated with an aqueous solution containing an alkali metal bisulfite, alkaline earth metal bisulfite, or ammonium bisulfite. In some instances, when less sulfur dioxide is present in the aqueous solutions, all or portions of the metal or the ammonium cations may be present in the monosulfite form. In still other instances, excess sulfur dioxide may be present in the solutions, over and above the amount necessary to maintain the cations in the bisulfite form, thus giving rise to what is specifically referred to as an acid sulfite solution. All of these solutions are usually collectively or generically referred to as sulfite cooking liquors.

The sulfite cooking liquors dissolve much of the lignin, some of the hemi-cellulose, as well as other components of the cellulosic material employed, leaving the majority of the cellulose fibers undissolved. The undissolved cellulose fibers are separated from the solution and the remaining solution containing the dissolved components is known as waste sulfite liquor. The waste sulfite liquor has dissolved therein lignosulfonates and other organic and inorganic compounds of the cation used in the cooking liquor, and of any other cations that may have been present in the sulfite cooking liquor or the cellulosic material.

One of the commonly used sulfite cooking liquors contains ammonium ion as the principal cation, and accordingly, the resulting waste sulfite liquor is known as ammonia-base waste sulfite liquor.

The ammonia-base waste sulfite liquor solutions contain valuable chemicals such as organic and inorganic salts of the ammonium ion, sulfur in various forms, and a number of organic constituents. As a result, efforts have been made to develop methods for recovering these valuable components, and particularly for recovering sulfur dioxide and ammonia for use in the preparation of fresh sulfite cooking liquor and for recovering heating values from the organics.

Unfortunately, because of the amounts of calcium compounds present in ammonia-base waste sulfite liquor, it is usually economically prohibitive to attempt to recover the valuable components of the waste liquor without first reducing the calcium content, and desirably removing essentially all of the calcium from the liquors. More specifically, the amounts of calcium compounds present in the ammonia-base waste sulfite liquor cause scaling problems to occur in various processing equipment such as evaporators, absorbers, recovery boilers and the like, which equipment is or would be used in most processes for recovering the aforesaid valuable components.

The calcium present in ammonia-base waste sulfite liquor comes from the wood used in the pulping process, from impurities in the water used to make the sulfite cooking solution, and from the various chemicals used in the cooking process.

OBJECTS AND SUMMARY OF THE INVENTION

The object of the present invention is to provide a process for reducing the amount of calcium contained in ammonia-base waste sulfite liquor.

Other objects of the present invention will be apparent to those skilled in the art from the following more detailed description.

According to the present invention, a source of sulfite ions, "additional" calcium (that is, calcium in excess of the amount present in the ammonia-base waste sulfite liquor obtained from the sulfite pulping process) and magnesium are dissolved in an ammonia-base waste sulfite liquor. These materials are added to the ammonia-base waste sulfite liquor to precipitate the calcium therefrom as calcium sulfite.

The magnesium, that is, magnesium ions, are added to the ammonia-base waste sulfite liquor in sufficient amounts so that the waste sulfite liquor solution contains above about 9000 p.p.m., based on the weight of the solution, of dissolved "ammonia-magnesium cations." The expression "ammonia-magnesium cations," as used herein, means the amount of magnesium and the amount of ammonia, expressed as magnesium equivalents, which are dissolved in the ammonia-base waste sulfite liquor. The p.p.m. of dissolved ammonia are converted to p.p.m. of dissolved magnesium equivalent by multiplying the p.p.m. of dissolved ammonia by a factor of 0.715.

If more than about 50 p.p.m. of sodium and/or potassium are dissolved in the ammonia-base waste sulfite liquor, the respective amounts of sodium and potassium should also be converted to magnesium equivalents and included in the total "ammonia-magnesium cation" figure. The p.p.m. of dissolved sodium are multiplied by 0.529 and the p.p.m. of dissolved potassium by 0.311 to convert each to p.p.m. of dissolved magnesium equivalents.

It is important to note that the p.p.m. of dissolved magnesium, ammonia, sodium and/or potassium are to include not only the amounts that may be added during the calcium reduction treatment of the present invention, but also the amounts present in the original ammonia-base waste sulfite liquor obtained from the pulping process.

The essence of the present invention is the surprising discovery that when additional calcium is added to an ammonia-base waste sulfite liquor and the liquor contains above about 9000 p.p.m. of dissolved ammonia-magnesium cations, any given level of calcium reduction can be obtained adding less sulfite ion and less magnesium ion than when no added calcium is employed.

In its broadest aspect, the present invention is intended to cover dissolving any additional amount of calcium in the ammonia-base waste sulfite liquor in excess of the amount of calcium contained in the waste liquor recovered from the sulfite pulping process. In one of its preferred aspects, calcium is added in an amount sufficient to yield a waste sulfite liquor containing up to about 2000 p.p.m. of dissolved calcium prior to precipitation of calcium sulfite.

DETAILED DESCRIPTION OF THE PREFERRED EMBODIMENTS

The term "ammonia-base waste sulfite liquor" as used herein is intended to include all waste sulfite cooking liquors obtained from pulping processes wherein the original sulfite cooking liquor contains ammonium as the major or principal cation, on a weight basis. It is to be understood that the original sulfite cooking liquor can be of any specific type, ranging from neutral to the acid sulfite form depending on the amount of sulfur dioxide dissolved therein. The only requirement is that ammonium be the major or principal cation. Normally, ammonia-base waste sulfite liquors contain between about 4000 and 8000 p.p.m. of ammonia, between about 300 and 600 p.p.m. of calcium up to about 100 p.p.m. magnesium and below about 100 p.p.m. of other cations such as strontium, barium, iron, aluminum, sodium, potassium and the like The pH of the ammonia-base waste sulfite liquor as obtained from the pulping processes is normally between about 1.5 and 4.5.

The calcium in ammonia-base waste sulfite liquor is normally dissolved in the liquor in the form of various organic and inorganic salts such as lignosulfonates, oxalates, acetates and sulfates as well as in the form of calcium bisulfite.

By the use of the process of the present invention the calcium content of ammonia-base waste sulfite liquor can be reduced. If desired, the calcium level can be reduced to below about 100 p.p.m., and even to about 50 p.p.m. or lower (based on the weight of the waste sulfite liquor solution). When the calcium level is below about 100 p.p.m., the ammonia-base waste sulfite liquor can be more effectively and economically processed to recover ammonia and other valuable components employing such techniques as evaporators, recovery boilers, absorbers and the like. This is because scaling, if any, which occurs at such low calcium levels, is not economically prohibitive.

As previously mentioned, the present invention requires that magnesium be dissolved in the ammonia-base waste sulfite liquor. The source of magnesium may be any compound or material which will dissolve (or be dissolved by the presence of sulfite ions) in the ammonia-base waste sulfite liquor to provide dissolved magnesium, i.e., magnesium ions, therein. The magnesium compound or material used should not cause adverse side reactions, interfere with the precipitation of calcium sulfite and its recovery, or add any deleterious substance to the waste sulfite liquor.

Suitable magnesium compounds which may be used are magnesium hydroxide, magnesium oxide, magnesium carbonate and magnesium sulfite. In addition, minerals or ores containing magnesium compounds may also be used, such as dolomite ($CaCO_3MgCO_3$), brucite ($MgO \cdot H_2O$), and magnesite ($MgCO_3$). These minerals when found in nature normally have extraneous material associated with them which may be removed to form concentrates, and it is understood that these expressions include concentrates of the minerals as well as the minerals themselves.

Mixtures of the above magnesium compounds and minerals may be employed, for example, magnesium sulfite and magnesium hydroxide, or magnesium sulfite and dolomite, and the like. Preferably, magnesium hydroxide, magnesium sulfite or dolomite is used.

The magnesium compound or material is dissolved in the ammonia-base waste sulfite liquor in an amount sufficient to yield a waste liquor solution containing above about 9000 p.p.m. and preferably between about 10,500 and 15,000 p.p.m., based on the weight of the solution, of dissolved ammonia-magnesium cations.

"Additional" calcium is also dissolved in the ammonia-base waste sulfite liquor, that is, in excess of the original amount of calcium present in the ammonia-base waste sulfite liquor obtained from the pulping process.

The source of additional calcium may be any compound or material which will dissolve (or be dissolved in the presence of sulfite ions) in the ammonia-base waste sulfite liquor to provide dissolved calcium i.e., calcium ions, therein. As with the magnesium, the calcium compound or material used should not cause adverse side reactions, interfere with the precipitation of calcium sulfite and its recovery, or add any deleterious substance to the waste sulfite liquor. Several calcium compounds that may be used include calcium hydroxide, calcium oxide, calcium carbonate, calcium sulfite, and minerals containing calcium such as dolomite, brucite, limestone and chalk.

Any "additional" amount of calcium may be dissolved in the ammonia-base waste sulfite liquor in accordance with the present invention. As previously indicated, the additional calcium will enable the desired calcium reduction to take place with the use of less magnesium ions and less sulfite ions. In other words, if it is desired to reduce the calcium content of an ammonia-base waste sulfite liquor from 300 p.p.m., for example, to 100 p.p.m., less magnesium compound or material and less sulfite ion will be used when additional calcium is added as compared to when no additional calcium is added.

While any amount of additional calcium may be dissolved in the waste sulfite liquor in accordance with the present invention, usually, the additional calcium is dissolved in amounts such that the waste sulfite liquor contains up to about 2000 p.p.m., preferably up to about 1,250 p.p.m. and more preferably about 1,250 p.p.m., of calcium dissolved therein, based on the weight of the waste sulfite liquor solution (this includes the calcium already dissolved in the original waste liquor obtained from the pulping process).

It has been found that little additional improvement is obtained when more than about 2000 p.p.m. of dissolved calcium are contained in the ammonia-base waste sulfite liquor. In other words, increasing the calcium content from between about 300 and 600 p.p.m. (the used amount of calcium dissolved in ammonia-base waste sulfite liquor) to about 2,000 and preferably about 1,250 p.p.m., is all that is usually necessary in accordance with the present invention. However, higher amounts of dissolved calcium can be used if so desired.

Moreover, each incremental addition of dissolved calcium will, in many instances, give a further improvement. That is, raising the dissolved calcium level to 700 p.p.m. will usually require less dissolved magnesium and sulfite ions to obtain a certain calcium reduction, as compared to raising the dissolved calcium level to only 500 p.p.m. A further raise in the dissolved calcium level to 900 p.p.m. will usually require still lower amounts of the other ingredients, and so on up to about 2000.

The above amounts of dissolved calcium and ammonia-magnesium cations should be obtained in the waste sulfite liquor solution before the calcium sulfite precipitation is complete. For example, some of the calcium and magnesium requirements may be added as calcium sulfite is precipitating, provided the total desired amount is dissolved in the waste sulfite liquor before completing precipitation. With respect to the calcium, it is preferred that all of the additional calcium which is to be added be dissolved in the waste sulfite liquor before any calcium sulfite precipitation occurs, for example, prior to raising the pH of the waste sulfite liquor solution above about 4.0.

In addition to the added calcium and magnesium the ammonia-base waste sulfite liquor is also provided with a source of sulfite ions. The presence of sulfite ions in the waste sulfite liquor serves several functions. First, sufficient sulfite ions must be available to dissolve the magnesium and calcium compounds or materials that are added to the waste sulfite liquor. In addition, sulfite ions must be provided to combine with calcium, and, under the reaction conditions used, to cause calcium to precipitate as calcium sulfite. Furthermore, the sulfite ions assist in adjusting the pH of the waste sulfite liquor, for example, by keeping the pH from rising above the desired level as the magnesium and calcium components are added.

Any convenient source of sulfite ions may be used in the present invention such as sulfur dioxide, magnesium sulfite, ammonium sulfite, calcium sulfite and sodium sulfite. Preferably, sulfur dioxide or magnesium sulfite is used. In the instances when it is necessary to provide sulfite ions for purposes of dissolving calcium and/or magnesium compounds or materials, the sulfite ion source is normally sulfur dioxide.

The sulfite ions are usually provided in sufficient amount to adjust the pH so that at the completion of the dissolution of the added calcium and magnesium the pH of the waste sulfite liquor is between about 5 and 7, preferably between about 5.5 and 6.5, and more particularly at about 5.7. Under these conditions calcium contained in the waste sulfite liquor precipitates as calcium sulfite. If it is desired to precipitate calcium sulfite without any substantial amount of precipitation of magnesium salts, the pH should preferably not exceed about 6.0. Substantial precipitation of magnesium salts would normally exist when the resulting precipitate contains about 3 percent by weight of magnesium salts based on total weight of the washed precipitate.

The calcium sulfite precipitate is separated from the remaining waste sulfite liquor solution by any conventional technique such as filtration, settling and the like.

The additional calcium, magnesium and sulfite ions may be added to the ammonia-base waste sulfite liquor in any convenient manner known to those skilled in the art and in any order desired. One preferred sequence, however, is to maintain the pH of the waste sulfite liquor below about 4 (such as by the addition of sulfur dioxide) until all of the additional calcium to be added is dissolved and a major portion of the magnesium to be added is dissolved, and then add the remaining magnesium along with more sulfur dioxide, if needed, to reach the desired final pH.

The addition of the above substances to the waste sulfite liquor as well as the precipitation and separation of calcium sulfite precipitate from the remaining solution is conveniently conducted at atmospheric pressure and at a temperature of above about 50° C., such as between about 60 and 100° C., and preferably between about 70 and 95° C. If desired, higher pressures and temperatures can be used provided adverse reactions are avoided.

Once the magnesium and added calcium are dissolved in the waste sulfite liquor solution and the final desired pH is obtained, up to about 30 minutes or more of residence time is usually sufficient to obtain completion of calcium sulfite precipitation.

After the calcium sulfite precipitate is removed from the remaining waste sulfite liquor solution it may be treated to obtain calcium compounds and sulfur dioxide. The waste solution remaining, i.e., filtrate, can be treated to obtain ammonium and magnesium compounds as well as other valuable components. Because of the reduced calcium level in the waste sulfite liquor, scaling problems are minimized and desirably eliminated. The recovered ammonia may be used, for example, to prepare new sulfite cooking liquor.

The following examples illustrate methods of carrying out the present invention.

Examples

The following Table I contains a listing of 28 experiments, denoted as Run Nos. 1 to 28, which were conducted to demonstrate the results that can be obtained by the process of the present invention.

Ammonia-base waste sulfite liquor was obtained from a pulping process and was analyzed to determine its calcium, ammonia and magnesium contents.

The ammonia-base waste sulfite liquor used in the Runs 1–28 was found to contain 4,500 p.p.m. of ammonia (3,220 magnesium equivalent), 89 p.p.m. maganesium, and 350 p.p.m. of calcium, all of which was dissolved in the liquor.

The pH of the liquor as received from the pulping mills was about 2.

In Runs 1 to 6 no additional calcium was added to the liquor. However, in each of the remaining runs various amounts of calcium hydroxide were added to the liquors. For example, in Run 7, it can be seen from column 2 of the table that 420 p.p.m. of additional calcium were dissolved in the waste sulfite liquor feed to obtain a total of 770 p.p.m. As indicated in column 2, the additional calcium was dissolved prior to any calcium sulfite precipitation.

In each of the Runs 1 to 28, magnesium hydroxide was also added to the waste sulfite liquor feed in order to supply magnesium ions in the liquor. The amount of magnesium added in each run is the difference between columns 4 and 5.

Sulfur dioxide was used in each run to assist in dissolving the calcium hydroxide and magnesium hydroxide in the liquor, and to adjust the pH of the liquor to a final value of 5.7. In each run, the liquor was held at the final pH of 5.7 for 20 minutes, with continuous stirring. The temperature of the liquor was held constant at 70° C.

At the end of the 20 minute period calcium sulfite precipitation had been completed. A sample of the solution was taken, the precipitate separated therefrom by filtration and the filtrate analyzed.

Column 5 of Table I lists the amount of magnesium which was dissolved in the filtrate, column 6 the p.p.m. of ammonia and column 8 the p.p.m. of calcium.

Column 7 of Table I is the ammonia-magnesium cations which are the total of column 5 and the magnesium equivalent figure of the ammonia in the filtrate, which in all runs is 3,220 p.p.m.

TABLE I

| Run Number | Ca (p.p.m.) dissolved in WSL prior to precipitation | WSL from pulping process | | Mg (p.p.m.) in filtrate | NH₃ (p.p.m.) in filtrate | Ammonia-magnesium cations | Ca (p.p.m.) in filtrate |
|---|---|---|---|---|---|---|---|
| | | NH₃ (p.p.m.) | Mg (p.p.m.) | | | | |
| 1 | 350 | 4,500 | 89 | 12,000 | 4,500 | 15,220 | 84 |
| 2 | 350 | 4,500 | 89 | 10,800 | 4,500 | 14,020 | 92 |
| 3 | 350 | 4,500 | 89 | 9,800 | 4,500 | 13,020 | 129 |
| 4 | 350 | 4,500 | 89 | 7,950 | 4,500 | 11,170 | 310 |
| 5 | 350 | 4,500 | 89 | 6,250 | 4,500 | 9,470 | 415 |
| 6 | 350 | 4,500 | 89 | 14,000 | 4,500 | 17,220 | 95 |
| 7 | 770 | 4,500 | 89 | 3,520 | 4,500 | 6,740 | 840 |
| 8 | 730 | 4,500 | 89 | 4,160 | 4,500 | 7,380 | 778 |
| 9 | 680 | 4,500 | 89 | 5,100 | 4,500 | 8,320 | 290 |
| 10 | 656 | 4,500 | 89 | 7,350 | 4,500 | 10,570 | 164 |
| 11 | 738 | 4,500 | 89 | 8,150 | 4,500 | 11,370 | 105 |
| 12 | 870 | 4,500 | 89 | 6,600 | 4,500 | 9,820 | 173 |
| 13 | 890 | 4,500 | 89 | 11,300 | 4,500 | 14,520 | 68 |
| 14 | 890 | 4,500 | 89 | 9,050 | 4,500 | 12,270 | 91 |
| 15 | 880 | 4,500 | 89 | 11,600 | 4,500 | 14,820 | 60 |
| 16 | 890 | 4,500 | 89 | 11,400 | 4,500 | 14,620 | 57 |
| 17 | 1,410 | 4,500 | 89 | 3,300 | 4,500 | 6,520 | 1,418 |
| 18 | 1,290 | 4,500 | 89 | 4,600 | 4,500 | 7,820 | 614 |
| 19 | 1,300 | 4,500 | 89 | 6,450 | 4,500 | 9,670 | 137 |
| 20 | 1,300 | 4,500 | 89 | 8,030 | 4,500 | 11,250 | 76 |
| 21 | 1,316 | 4,500 | 89 | 9,400 | 4,500 | 12,620 | 63 |
| 22 | 1,250 | 4,500 | 89 | 10,700 | 4,500 | 13,920 | 54 |
| 23 | 1,380 | 4,500 | 89 | 12,200 | 4,500 | 15,420 | 52 |
| 24 | 1,720 | 4,500 | 89 | 9,400 | 4,500 | 12,620 | 49 |
| 25 | 1,780 | 4,500 | 89 | 8,750 | 4,500 | 11,970 | 60 |
| 26 | 1,860 | 4,500 | 89 | 7,250 | 4,500 | 10,470 | 104 |
| 27 | 1,900 | 4,500 | 89 | 5,550 | 4,500 | 8,770 | 240 |
| 28 | 2,000 | 4,500 | 89 | 3,750 | 4,500 | 6,970 | 1,290 |

As can be seen from the above table, when calcium is added to the ammonia-base waste sulfite liquor, lower amounts of magnesium are required. Compare, for example, Runs 6 and 14. In the former, 17,220 p.p.m. ammonia-magnesium cations were required to reduce the calcium level from 350 p.p.m. to 95 p.p.m., while in the latter, when 540 p.p.m. of "additional" calcium were added, only 12,270 p.p.m. of ammonia-magnesium cations were needed. About 5,000 more p.p.m. of magnesium was added in Run 6. When the ammonia-magnesium cation level is below about 9,000 p.p.m. the initial calcium level is not significantly reduced, if at all, even with added calcium. See Runs 7, 8, 9, 17, 18, 27 and 28. Similar results are obtained when magnesium sulfite is used in place of magnesium hydroxide.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled the art without departing from the spirit of the present invention.

We claim:

1. A process for treating ammonia-base waste sulfite liquor containing calcium in order to reduce the amount of calcium contained therein by precipitating calcium from the waste sulfite liquor as calcium sulfite, which process comprises:
   (a) adding magnesium ions to said waste sulfite liquor so as to obtain a waste sulfite liquor solution containing above about 9,000 p.p.m. of ammonia-magnesium cations dissolved therein prior to the completion of precipitation of said calcium sulfite;
   (b) adding additional calcium ions to said waste sulfite liquor prior to the completion of precipitation of said calcium sulfite;
   (c) adding a source of sulfite ions to said waste sulfite liquor in at least an amount sufficient to cause the calcium contained therein to precipitate as calcium sulfite; and
   (d) separating said precipitated calcium sulfite from the remaining waste sulfite liquor solution.

2. The process of claim 1 wherein said magnesium ions are added to the waste sulfite liquor by dissolving in said waste sulfite liquor a member selected from the class consisting of magnesium hydroxide, magnesium oxide, magnesium sulfite, magnesium carbonate, dolomite, brucite and magnesite.

3. The process of claim 2 wherein the source of said sulfite ions is sulfur dioxide.

4. The process of claim 3 wherein said additional calcium ions are added to the waste sulfite liquor by dissolving in said waste sulfite liquor a calcium compound selected from the class consisting of calcium hydroxide, calcium oxide, calcium carbonate, calcium sulfite, brucite, limestone, chalk and dolomite.

5. The process of claim 4 wherein said calcium compound is dissolved in said waste sulfite liquor to obtain, prior to the completion of precipitation of said calcium sulfite, a waste sulfite liquor solution containing up to about 2,000 p.p.m. of calcium dissolved therein.

6. A process for treating ammonia-base waste sulfite liquor containing calcium in order to reduce the amount of calcium contained therein by precipitating calcium from the waste sulfite liquor as calcium sulfite, which process comprises:
   (a) adding to said waste sulfite liquor a member selected from the class consisting of magnesium hydroxide, magnesium oxide, magnesium sulfite, magnesium carbonate, dolomite, brucite and magnesite so as to obtain a waste sulfite liquor solution containing above about 9,000 p.p.m. of ammonia-magnesium cations dissolved therein prior to the completion of precipitation of said calcium sulfite;
   (b) adding to said waste sulfite liquor a calcium compound selected from the class consisting of calcium hydroxide, calcium oxide, calcium carbonate, calcium sulfite, brucite, limestone, chalk and dolomite so as to dissolve additional calcium in said waste sulfite liquor prior to the precipitation of calcium sulfite;
   (c) adding to said waste sulfite liquor a member selected from the class consisting of sulfur dioxide, magnesium sulfite, ammonium sulfite, calcium sulfite and sodium sulfite so as to provide sulfite ions in said waste sulfite liquor in at least an amount sufficient to cause the calcium contained therein to precipitate as calcium sulfite; and (d) separating said precipitated calcium sulfite from the remaining waste sulfite liquor solution.

7. The process of claim 6 wherein between about 10,500 and 15,000 p.p.m. of ammonia-magnesium cations are dissolved therein.

8. The process of claim 7 wherein about 1,250 p.p.m. of calcium is dissolved in said waste sulfite liquor prior to the precipitation of said calcium sulfite.

9. The process of claim 8 wherein the pH of the waste sulfite liquor solution is between about 5 and 7 during the calcium sulfite precipitation.

10. The process of claim 9 wherein sulfur dioxide is added to provide the sulfite ions in said waste sulfite liquor.

11. The process of claim 8 wherein the pH of the waste sulfite liquor solution is between about 5.5 and 6.5 during the calcium sulfite precipitation.

12. The process of claim 11 wherein the calcium compound is calcium hydroxide and the sulfite ions are provided by adding sulfur dioxide.

13. The process of claim 12 wherein dolomite is used to add the magnesium ions.

14. The process of claim 12 wherein magnesium hydroxide is used to add the magnesium ions.

References Cited
UNITED STATES PATENTS

| | | | |
|---|---|---|---|
| 2,644,748 | 7/1953 | Cunningham | 162—36 |
| 2,210,405 | 8/1940 | Haywood | 423—512 |
| 2,739,039 | 3/1956 | Phelps | 162—36 X |
| 1,834,845 | 12/1931 | Jones | 210—53 |
| 2,750,290 | 6/1956 | Schoeffel | 162—36 |

S. LEON BASHORE, Primary Examiner

R. V. FISHER, Assistant Examiner

U.S. Cl. X.R.

423—512, 517